Aug. 11, 1925.  1,548,917
J. G. VINCENT
MOTOR BOAT
Filed June 8, 1923  2 Sheets-Sheet 2
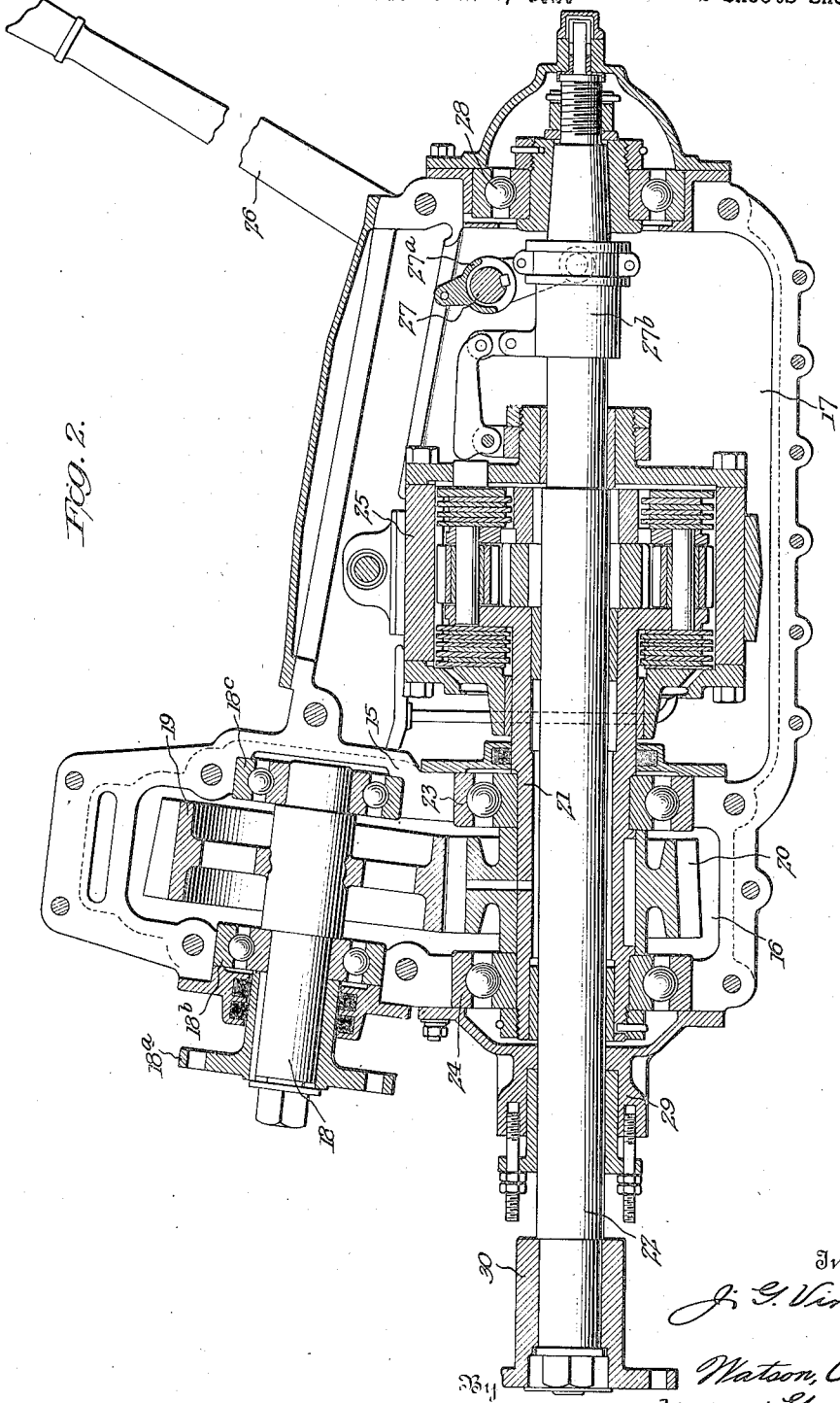

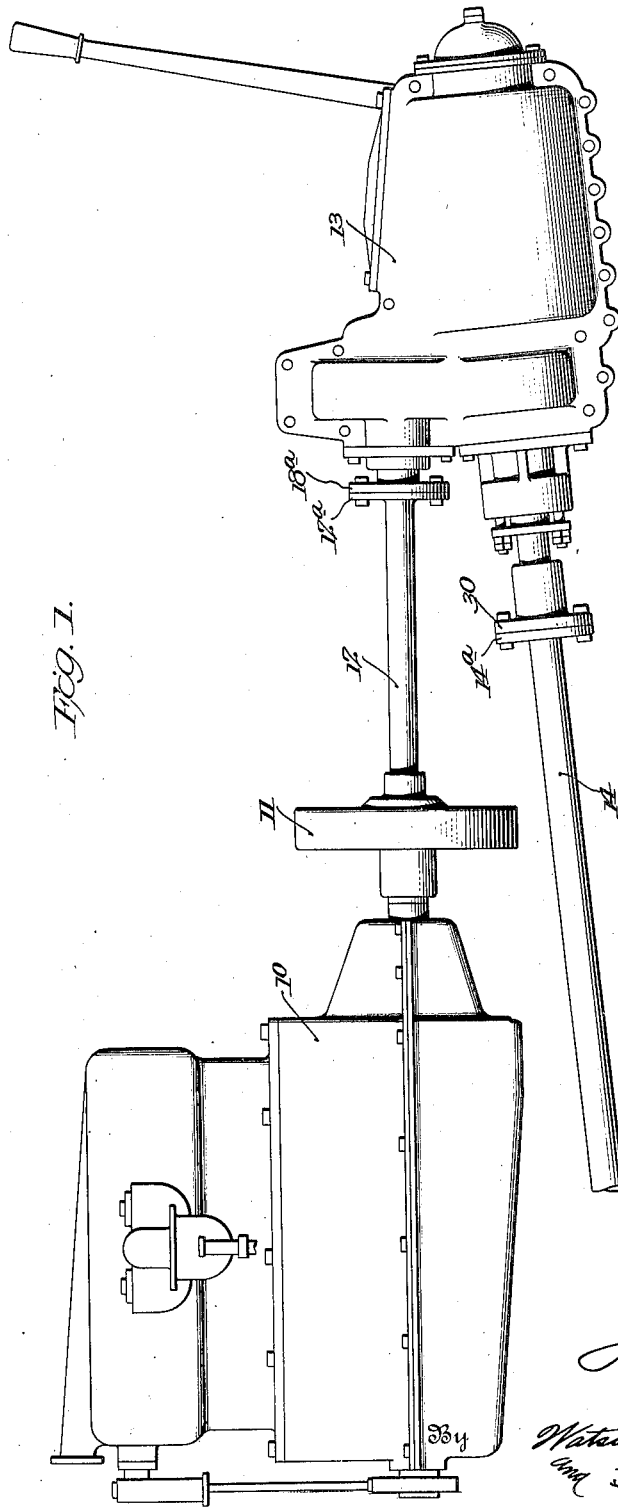

Patented Aug. 11, 1925.

1,548,917

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR BOAT.

Application filed June 8, 1923. Serial No. 644,271.

*To all whom it may concern:*

Be it known that I, JESSE G. VINCENT, a citizen of the United States, and a resident of Detroit, county of Wayne, and State of Michigan, have invented certain new and useful Improvements in Motor Boats, of which the following is a specification.

The present invention relates to motor boats and more particularly to the means for transmitting power from the engine to the propeller.

In boats of this type, it is common to drive the propeller shaft at a higher speed than the engine shaft, and provide a reversing device on the shaft that rotates at the same speed as the engine shaft.

The principal aim of the present invention is to provide an arrangement wherein a smaller reversing unit than heretofore may be employed. This is accomplished by disposing the gearing so that the reversing device is on the shaft that rotates at the same speed as the propeller shaft. As this propeller shaft rotates at a higher speed than the engine shaft, the torque is of less amount, permitting a smaller reversing unit.

Another object of the invention is to provide a transmission unit of rugged and compact construction.

Other objects and features of novelty will be apparent from the description taken in connection with the drawings, in which:

Figure 1 is a side elevation of a transmission unit and motor constructed in accordance with the present invention.

Figure 2 is a vertical sectional elevation through the transmission unit.

Referring to Figure 1, which shows the general arrangements of the parts, the motor or engine is indicated by numeral 10, said motor having a fly wheel 11. A shaft 12, which is connected to the engine shaft and rotates at the same speed as the engine shaft, extends into the transmission casing 13. Disposed within this casing is gearing and a reversing clutch device which rotatively connects the shaft 12 to the propeller shaft 14.

The casing or housing of the transmission unit comprises two flanged sections bolted together in a vertical plane passing through the transmission shafts, whereby the casing may be opened up easily for access to the interior mechanism.

The casing has an elongated form with an enlarged after end for housing the gear wheels of the transmission, and is divided, by a transverse partition 15, into an after compartment 16, and a forward compartment 17. Mounted in the upper compartment and projecting from one side of the casing is a short shaft 18 rotatively supported in the bearings $18^b$ and $18^c$, disposed respectively in the after wall of the casing and the partition 15. Outside the casing, the shaft 18 is provided with a flanged coupling member $18^a$ adapted to be bolted to a complementary flanged coupling member $12^a$ on the end of the engine or driving shaft 12. Within the compartment 16 is a gear wheel 19, fixed to the shaft 18 and meshing with a smaller gear wheel 20 secured to rotate with a sleeve 21. This sleeve is mounted for rotation relative to a shaft 22 which extends through the same, bearings 23 and 24 being provided for the sleeve. The sleeve projects into the compartment 17 of the transmission casing and is connected with a reversing clutch mechanism 25. The reversing device illustrated is of the planetary type and is adapted to connect sleeve 21 directly with shaft 22 for a forward drive, and to connect said sleeve and shaft through the planetary gearing to give a reverse drive. Any suitable type of reversing clutch may be employed, and as the details thereof are well known and form no part of the present invention, it needs no further description. The reversing clutch is operated by a lever 26 which is secured to a transverse rock shaft 27 disposed within the casing and projecting from one side thereof. This rock shaft is provided with the usual yoke $27^a$ for operating the slidable sleeve $27^b$ and thereby actuating the reversing clutch.

The driven shaft 22 is rotatably supported in the forward end of the casing by a bearing 28 and in the after end of the casing by a bearing 24, a stuffing box 29 being provided to prevent leakage of lubricant. The projecting after end of shaft 22 carries a flanged coupling member 30 adapted to be bolted to a complementary coupling member $14^a$ secured to the propeller or driven shaft 14.

With the arrangement thus described, it will be seen that the driven or propeller shaft is rotated at a higher speed than the engine or driving shaft because the gear 20 is smaller than the gear 19. Consequently, the reversing device is not called upon to transmit as great a torque as if it were located on the engine shaft. As a result, a smaller reversing unit may be employed and the life of the whole mechanism prolonged. Furthermore, the change in location of the clutch device makes it possible to provide a transmission unit of rugged and compact construction, in which the transmission shafts, gears and clutch mechanism are all contained within the same casing and can be readily handled as a unit.

Although a particular embodiment of the invention has been described in detail, it is to be understood that the invention is not thus limited but includes modifications and changes which come within the scope of the appended claims.

What I claim to be new and desire to secure by Letters Patent is:

1. A motor boat transmission unit, including in combination, an elongated gear casing, a driving shaft journaled in the after end of said casing adapted for connection to an engine shaft, a driven shaft in said casing journaled in both ends thereof at an angle to said driving shaft adapted for connection to a propeller shaft, a sleeve rotatable on said driven shaft, intermeshing gear wheels fixed to said sleeve and driving shaft respectively, the sleeve carrying the smaller of said gears, and a reversing clutch mechanism mounted on said sleeve forward of said gears adapted to connect said sleeve to said driven shaft for forward or reverse drive.

2. A motor boat transmission unit, including in combination, an elongated gear casing, a driving shaft journaled in the after end of said casing adapted for connection to an engine shaft, a driven shaft in said casing journaled in both ends thereof at an angle to said driving shaft adapted for connection to a propeller shaft, a sleeve rotatable on said driven shaft, intermeshing gear wheels fixed to said sleeve and driving shaft respectively, the sleeve carrying the smaller of said gears, a reversing clutch mechanism mounted on said sleeve forward of said gears adapted to connect said sleeve to said driven shaft for forward or reverse drive, a transverse rock shaft journaled in the forward end of said casing, means connecting said rock shaft to said clutch mechanism to operate the latter, said rock shaft projecting outside said casing, and an arm secured to the projecting end of said rock shaft.

3. A motor boat transmission unit, including in combination, an elongated gear casing, a driving shaft journaled in the after end of said casing adapted for connection to the engine shaft, a driven shaft in said casing journaled in both ends thereof at an angle to said driving shaft adapted for connection to the propeller shaft, a relatively large gear in said casing fixed to said driving shaft, a smaller gear rotatable on said driven shaft, and a reversing clutch mechanism mounted on said driven shaft forward of said gears adapted to connect said smaller gear to said driven shaft for either direct or reverse drive.

4. A motor boat transmission unit, including in combination, a gear casing, a driving shaft journaled in said casing adapted for connection to an engine shaft, a driven shaft journaled in said casing at an angle to said driving shaft adapted for connection to a propeller shaft, a relatively large gear in said casing fixed to said driving shaft, a smaller gear rotatable on said driven shaft, and a reversing clutch mechanism mounted on said driven shaft forward of said gears adapted to connect said smaller gear to said driven shaft for either direct or reverse drive.

5. A motor boat transmission unit, including in combination, a gear casing, a driving shaft journaled in said casing adapted for connection to an engine shaft, a driven shaft journaled at an angle to said driving shaft, a sleeve rotatable on said driven shaft, a pair of intermeshing gear wheels of different sizes fixed to said sleeve and driving shaft respectively, the smaller of said gears being on said sleeve, and a reversing clutch mechanism mounted on said sleeve forward of said gears adapted to connect said sleeve to said driven shaft for forward or reverse drive.

6. A motor boat transmission unit, including in combination, a driving shaft adapted for connection to an engine shaft, a driven shaft journaled at an angle to said driving shaft, a sleeve rotatable on said driven shaft, a pair of intermeshing gear wheels of different sizes fixed to said sleeve and driving shaft respectively, the smaller of said gears being on said sleeve, and a reversing clutch mechanism mounted on said sleeve adapted to connect said sleeve to said driven shaft for forward or reverse drive.

7. A transmission unit, including in combination, a gear casing, a driving shaft rotatably mounted in said casing, a driven shaft rotatable in said casing, a sleeve rotatable on said driven shaft, a pair of intermeshing gear wheels of different sizes fixed to said sleeve and driving shaft respectively, the smaller of said gears being on said sleeve, and a reversing clutch mechanism mounted on said sleeve adapted to connect said sleeve to said driven shaft for forward or reverse drive.

8. A transmission unit, including in combination, a gear casing, a driving shaft journaled in said casing, a driven shaft journaled in said casing, a relatively large gear wheel in said casing fixed to said driving shaft, a smaller gear rotatable on said driven shaft and driven by said large gear wheel, and a reversing clutch mechanism mounted on said driven shaft adapted to connect said smaller gear to said driven shaft for forward or reverse drive.

9. A motor boat transmission unit, including in combination, an elongated gear casing having a transverse partition dividing it into forward and after compartments, a driven shaft journaled in the ends of said casing extending in a fore and aft line, a driving shaft journaled in said partition and in the after end of said casing and extending at an angle to said driven shaft, a sleeve on said driven shaft rotatably mounted in the after end of said casing and in said partition and extending into said forward compartment, a pair of intermeshing gear wheels of different sizes in said after compartment fixed to said driving shaft and sleeve respectively, said sleeve carrying the smaller gear, and a reversing clutch in said forward compartment mounted on said sleeve adapted to connect said sleeve to said driven shaft for forward or reverse drive.

10. A motor boat transmission unit, including in combination, an elongated gear casing having a transverse partition dividing it into forward and after compartments, a driven shaft journaled in the ends of said casing extending in a fore and aft line and having an end projecting outside said casing adapted for connection to the propeller shaft, a driving shaft journaled in the partition and after end of said casing and extending at an angle to said driven shaft and having an end projecting outside said casing adapted for connection to the engine shaft, a sleeve on said driven shaft rotatably mounted in said partition and extending into said forward compartment, a pair of intermeshing gear wheels of different sizes in said after compartment fixed to said driving shaft and sleeve respectively, said sleeve carrying the smaller gear, a reversing clutch in said forward compartment mounted on said sleeve, adapted to connect said sleeve to said driven shaft for forward or reverse drive, a transverse rock shaft journaled in the forward end of said casing, an operative connection between said rock shaft and said clutch mechanism, and an arm outside said casing fixed to said rock shaft.

11. A motor boat transmission, including in combination, a driving shaft connected to the engine, a driven shaft extending at an angle to said driving shaft in a fore and aft line, a sleeve on said driven shaft, a smaller gear fixed to said sleeve meshing with said large gear, and a reversing clutch on said sleeve adapted to connect said sleeve to said driven shaft for forward or reverse drive.

12. A motor boat transmission, including in combination, a driving shaft connected to the engine, a relatively large gear fixed to said driving shaft, a driven shaft extending at an angle to said driving shaft in a fore and aft line adapted to be connected to the propeller shaft, a smaller gear rotatable on said driven shaft meshing with said large gear, and a reversing clutch on said driven shaft adapted to connect said smaller gear to said driven shaft for forward or reverse drive.

13. A motor boat transmission, including in combination, a driving shaft connected to the engine, a propeller shaft, a sleeve rotatable on said propeller shaft, a pair of intermeshing gears of different sizes fixed to said driving shaft and sleeve respectively, said sleeve carrying the smaller of said gears, and a reversing clutch mounted on said sleeve adapted to connect said sleeve to said propeller shaft for forward or reverse drive.

14. A motor boat transmission, including in combination, a driving shaft connected to the engine, a relatively large gear fixed to said driving shaft, a propeller shaft, a smaller gear rotatable on said propeller shaft meshing with said large gear, and a reversing clutch on said propeller shaft adapted to connect said smaller gear to said propeller shaft for forward or reverse drive.

In testimony whereof I hereunto affix my signature.

JESSE G. VINCENT.